Patented Sept. 9, 1941

2,255,421

UNITED STATES PATENT OFFICE 2,255,421

PROCESS FOR PURIFICATION OF CARBOXYLIC ACIDS

Herbert P. A. Groll and Miroslav W. Tamele, Berkeley, Calif., assignors to Shell Development Company, San Francisco, Calif., a corporation of Delaware No Drawing. Application July 25, 1936, Serial No. 92,691

19 Claims. (Cl. 260—530)

This invention relates to the purification of carboxylic acids, and it more particularly relates to a process for the treatment of an impure carboxylic acid to refine and to remove objectionable and difficultly-removable impurities from the same.

The invention provides a commercially attractive and highly effective method for the refining of crude carboxylic acids and mixtures thereof which are unsuitable for use in many commercial processes for the reason that they contain varying amounts of objectionable impurities as aldehydic bodies, ketonic bodies, etc. which imprities are extremely difficult, and in some cases impossible, to remove by distillation methods. The principles of the invention are applicable with excellent results to the removal of objectionable and difficultly-removable oxidizable impurities from carboxylic acids obtained by effecting the oxidation of the corresponding aldehydes.

The process of the present invention comprises treating the impure carboxylic acid, preferably in the liquid phase, with an oxidizing agent for a time and at a temperature adequate to substantially oxidize at least a major portion of the detrimental impurities present in the treated acid to readily-removable and in many cases innocuous oxidized bodies, while leaving the carboxylic acid itself substantially unaffected, and separating the oxidized bodies from the treated carboxylic acid, preferably by distillation. In case that the oxidation treatment renders the objectionable impurities sufficiently innocuous, the separation step may be dispensed with if desired.

Carboxylic acids are prepared in commercial quantities by processes comprising the oxidation of the corresponding aldehydes. These oxidation processes are of great industrial importance; the aldehydes are readily available in large quantities and are obtained as by-products in a wide variety of chemical processes. However, the processes for the production of carboxylic acids from aldehydes by oxidation have not merited the application that one would expect when the low cost of such processes and the low cost and availability of the aldehydes is taken into consideration. The reason is that the acids prepared by such processes are always obtained in a rather crude form; they invariably contain impurities which prevent their use for numerous purposes where a pure, color-stable acid is required. The nature of the impurities is such that it is impossible to remove them in any effective quantity by fractional distillation or other physical means.

The nature of the impurities present in the crude acids varies with the particular aldehyde which has been oxidized, and with the nature of the impurities present in said aldehyde. In general, the obnoxious impurities are oxidizable organic compounds comprising, for the most part, the aldehydes, and most probably polymerization and condensation products of the aldehydes, from which the acid or acid mixture was prepared, as well as diacyl compounds and other ketonic bodies which are usually formed during such oxidation processes. The above are merely illustrative; other impurities may be originally present in the treated aldehyde or formed as by-products in the oxidation process. Many times the objectionable impurities are present in sufficient amounts to give the acid a yellow color and make it unsuitable for purposes requiring a colorless acid. Whether or not the acid is colorless, the impurities, varying in amounts from a fraction of a percent to as much as eight percent, are objectionable if the acids are used for certain industrial purposes, for example, in the manufacture of cellulose esters. If the impure acids are used for this purpose, the impurities react with sulphuric acid and cause discoloration of the product.

No successful process has heretofore been proposed for purifying carboxylic acids contaminated with difficultly-removable impurities of the type above-described. Attempts have been made to solve the problem by obviating the necessity of further purification of the acids obtained in aldehyde oxidation processes. To achieve this end, the aldehydes have been carefully purified prior to oxidation, and attempts have been made to vary and control the conditions of oxidation so as to prevent the formation of the obnoxious impurities. These methods have not been sufficiently successful to warrant their technical application.

The present invention provides a simple and effective process for purifying carboxylic acids obtained by the oxidation of aldehydes, or carboxylic acids from any other source, which are contaminated with oxidizable impurities. In accordance with our process, we may treat such contaminated acids and obtain products which are colorless and of high purity and suitable for any purpose to which a pure carboxylic acid may be put.

The process of the invention consists essentially in subjecting the crude or contaminated acid, in the liquid phase, to an oxidation treatment whereby the impurities are oxidized and thereby rendered innocuous or converted to readily-removable impurities which may be removed by distillation subsequent to the oxidation treatment. This oxidation of the impurities in the treated acid may be effected in a variety of manners, all of which are within the scope of our invention.

One embodiment of the invention comprises oxidation of the impurities with molecular oxygen at an elevated temperature in the presence or absence of catalysts for the oxidation. The crude acid to be purified is charged to a suitable reaction vessel capable of withstanding moderately elevated pressures and equipped with heating and cooling means, means for introducing gaseous oxygen or an oxygen-containing gas below the surface of the acid, and preferably equipped with means for effecting efficient contact of the gaseous oxygen with the acid, for example, mechanical stirring means, diffusers, etc. Oxygen alone or various oxygen-containing gases may be introduced into the heated acid. Suitable oxygen-containing gases are air and nitrogen-oxygen mixtures containing from about 22% to 80% or more oxygen such as may be obtained as by-products in the production of pure nitrogen from liquefied air. When molecular oxygen is employed, the treatment is preferably effected at an elevated temperature. Temperatures of from about 40° C. to about 200° C. being suitable, although higher temperatures may be used when necessary or desirable, depending upon the stability of the treated acid to oxidation, upon the catalyst, if a catalyst is used, and upon the pressure. The temperature-pressure relationship should preferably be such as to insure reaction in the liquid phase. When the aliphatic monobasic carboxylic acids are treated, excellent results may be obtained at temperatures of from about 80° C. to about 120° C. In general, the higher temperatures accelerate the oxidation reaction and decrease the time of treatment.

For the purpose of accelerating the rate of the purification reactions and to decrease losses of the acid during blowing with the oxygen or gas containing it, in many cases, it is desirable to operate under superatmospheric pressures, for example, pressures up to 15 atmospheres or greater. Losses of the acid may be further reduced by operating an efficient condensation system in communication with the reaction vessel, through which the effluent gases are passed, the condensed acid being returned to the reaction vessel.

The process can be conducted with or without catalysts. A wide variety of catalysts are suitable, particularly those which are capable of destroying peroxides. Suitable catalysts are the salts or oxides of elements of group VIII of the periodic table as well as salts of the rare earths, also said elements themselves. Platinum black and ferric salts are examples of good catalysts. Cerium, nickel and cobalt salts are also useful, particularly their salts of carboxylic acids. Other suitable catalysts are the maganese salts.

The various salts of the non-noble metals mentioned can be applied in a variety of ways. Practically any catalytically active salt, oxide or element soluble in the treated acid can be applied with the exception of chlorides which generally do not accelerate the oxidation.

The most useful concentration of the insoluble catalysts such as platinum black, colloidal platinum, etc. is dependent merely on the degree of dispersion, i. e., the available surface of the catalytic material.

Some other examples of suitable inorganic catalysts are cerium nitrate, the vanadium oxides and vanadium salts as ammonium metavanadate. The latter may be employed in amounts of from 0.05% to about 0.10% of the treated acid.

In some cases, and particularly when the acid to be purified contains relatively small amounts of the contaminating impurities, it may be desirable to effect complete purification of the acid by applying an oxidizing agent more powerful in character than molecular oxygen. If the acid to be purified contains a relatively large concentration of the contaminating impurities, it may be first subjected to the refining treatment with molecular oxygen to oxidize the major portion of the impurities and then treated with a more powerful oxidizing agent to effect oxidation of at least a part of the remainder of the impurities. This multiple step procedure may be preferred when the crude acid contains a large concentration of impurities due to the higher yield of purified acid which may be obtainable. However, the different procedures need not be used in combination; either may be used exclusively as desired, depending to a certain extent upon the concentration of impurities present in the acid, the nature of the impurities, the nature of the acid to be purified, and upon the degree of purification to be accorded the acid.

The more powerful oxidizing agents are preferably added to the acid to be purified in an amount equivalent to or in small excess of the amount of oxidizable impurities present. A group of suitable oxidizing agents more powerful than molecular oxygen in the execution of the present invention includes among others the following: ozone, hydrogen peroxide, nitric acid, nitrogen peroxide, the permanganates, the chromates, the dichromates, the chlorates, the perchlorates, the manganese oxides, and the like. Any of these and similar oxidizing agents may be used together with molecular oxygen, or a mixture of such agents with each other with or without oxygen may be used, or the various agents may be applied to the same crude acid successively.

The conditions of the refining operation with the agents as above-described will vary in accordance with the nature of the particular oxidizing agent or agents employed. Thus, ozone is preferably passed into the acid at low temperatures between about 0° C. and room temperature. The permanganates, usually in the form of relatively concentrated solutions, may be applied at room temperature or at elevated temperatures, for example, at the boiling temperature of the treated acid. Hydrogen peroxide, nitric acid, nitrogen peroxide and the manganese oxides are preferably employed at elevated temperatures, for example, at the temperature of the acid boiling under reflux. The refining operation in each case is continued until the desired oxidation of the impurities has been effected. The time necessary to effect the desired purification will depend upon various factors as the conditions of oxidation, the nature and amount of the impurities present, the nature and amount of the oxidizing agent, the use of a catalyst, etc. The time necessary for the treatment may be determined in various ways, for example, a sample can be withdrawn and analyzed from time to time.

As a specific embodiment of the invention, nitric acid and oxygen may be used together to oxidize the impurities present in the acid. Oxygen may be bubbled through the acid while heat is applied to raise the temperature of the acid to its boiling temperature. The nitric acid may then be added in any suitable concentration and in the desired amount to the acid boiling under reflux. Oxygen may be continuously passed through the acid and the acid maintained at about its boiling temperature until the brown fumes are no longer visible. The substantially purified acid may then be recovered by distillation. If further purification of the acid is desired, it may be subjected to further treatment with nitric acid and oxygen or it may be treated with another oxidizing agent as, for example, hydrogen peroxide.

After the refining operation, the treated acid should be freed of the products of the oxidation reaction if a substantially pure acid is desired. This final purification logically should be adapted to the character of the refining agent used. When the purification is effected with a gaseous or very volatile oxidizing agent as oxygen, air, ozone, etc., further purification of the acid, that is, removal of the products of the oxidation, may be effected by simple distillation. With the higher boiling and less stable acids, distillation under reduced pressure may be preferable. When the purification has been effected with agents such as permanganates, chromates, dichromates, manganese oxide, etc., the mixture may be distilled subsequent to the oxidation treatment, the solid material staying in the kettle as bottoms.

When nitric acid is applied as the oxidizing agent, the treated carboxylic acid may be freed of excess nitric acid and nitrogen peroxide by adding a corresponding amount of finely divided iron or a ferrous salt, heating, and removing the nitrous oxide by boiling. If desired an active gas as oxygen or air, or an inert gas as nitrogen may be passed into the treated acid during or after the oxidation treatment to aid in removal of gaseous reaction products. The acid may subsequently be subjected to a fractional distillation if desired.

The term "carboxylic acid" as used in this specification and the appended claims is intended to include those organic compounds possessing one or a plurality of organic acid carboxyl groups (—COOH). The carboxylic acids which may be purified in accordance with the process of our invention may be of aliphatic, aralkyl or cyclic character; they may be polybasic or monobasic, and in some cases they may be unsaturated or further substituted. Suitable acids, for example, which may be purified by our methods are the following: formic, acetic, propionic, normal butyric, isobutyric, valeric, isovaleric, oxalic, succinic, glutaric, malonic, benzoic, phenyl-acetic, phenyl-propionic, and the like and their homologues and suitable substitution products. Mixtures comprising a plurality of carboxylic acids may be treated or the constituents of such mixtures may be separated and treated severally.

The invention is particularly useful as applied to the purification of the aliphatic monobasic carboxylic acids as formic, acetic, propionic, butyric, valeric, caproic, etc., which acids when prepared by oxidation of the corresponding aldehydes are contaminated with impurities difficult and, in most cases, impossible to remove by the known methods.

For illustrative purposes only, reference will be had to the following specific examples, which show the invention applied to the purification of representative carboxylic acids.

Example I

About 9.5 liters of normal butyric acid containing about 0.100 equivalent of oxidizable impurities (0.11 equivalent per 100 gm. acid) were charged to a glass reaction vessel equipped with a dropping funnel, reflux condenser, and inlet tube for the introduction of oxygen below the surface of the treated acid. About 30 c. c. of water were added and heat was applied to the kettle while oxygen was bubbled slowly through the acid. When the acid was boiling gently, about 60 c. c. of 70% nitric acid was added slowly. The rate of addition of the nitric acid was regulated so that a minimum amount of brown vapors were lost through the reflux condenser. The addition of the nitric acid required about 60 minutes. When all of the nitric acid had been added, the acid was boiled vigorously with an increased oxygen flow until no more brown vapors were visible.

The mixture was then distilled and fractionated into the following fractions:

Start to 160° C.
160° C. to 163° C.
163° C. to finish.

The last cut was analyzed and found to contain about 0.006 equivalent of oxidizable matter per 100 gm. of acid.

About 9.4 liters of the acid refined as above-described were then charged to a still, about 40 c. c. of a 25% to 30% $H_2O_2$ solution added, and the mixture distilled. The following fractions were collected:

Start to 163° C.
163° C. to finish.

The acid boiling above 163° C. was analyzed; it contained only about 0.002 equivalent of oxidizable matter per 100 gm. of acid.

Example II

About 9.5 liters of crude normal valeric acid containing 0.108 equivalent of oxidizable impurities (0.012 equivalent per 100 gm. acid) were treated with about 60 c. c. of a 70% nitric acid solution in substantially the same manner as described in Example I. Following the treatment, the mixture was distilled and the following fractions collected:

Start to 182° C.
182° C. to 185° C.
185° C. to finish.

The last cut was analyzed; it contained about 0.007 equivalent of oxidizable matter per 100 gm. of acid.

About 9.4 liters of the normal valeric acid refined as above-described were charged to a still, about 40 c. c. of a 25% to 30% $H_2O_2$ solution added, and the mixture fractionally distilled. The following fractions were collected:

Start to 185° C.
185° C. to finish.

The acid boiling at a temperature above 185° C. contained about 0.0023 equivalent of oxidizable matter per 100 gm. of acid.

Example III

About 50 gm. of a crude normal butyric acid containing about 0.002 equivalent of oxidizable impurities (0.004 equivalent per 100 gm. acid)

were refluxed with about 5.0 gm. of a 3% aqueous solution of potassium permanganate (0.01 equivalent) for about 2 hours. At the end of this time the mixture was fractionated and the following fractions collected:

Start to 163° C.
163° C. to finish.

The acid boiling above 163° C. contained about 0.0017 equivalent of oxidizable matter per 100 gm. of acid.

*Example IV*

About 50 gm. of crude normal valeric acid containing about 0.055 equivalent of oxidizable impurities (0.011 equivalent per 100 gm. acid) were refluxed with about 5.0 gm. of a 10% aqueous solution of potassium permanganate (0.1 equivalent) for about 2 hours. At the end of this time the mixture was fractionated and the following fractions collected:

Start to 185° C.
185° C. to finish.

The acid boiling above 185° C. contained about 0.003 equivalent of oxidizable matter per 100 gm. of acid.

*Example V*

About 100 kg. of crude isobutyric acid containing about 4% of impurities were charged, along with 4.0 kg. of water and 4.3 kg. of 70% nitric acid, to a glass-lined still. The still charge was then fractionated. The first fraction distilled contained mostly water, some unchanged impurities, and small quantities of isobutyric acid and nitrous oxide. The isobutyric acid fraction (97 kg.) was water white and consisted of substantially pure isobutyric acid containing only traces of innocuous nitrogen compounds.

*Example VI*

About 3.2 kg. of a 30% aqueous solution of hydrogen peroxide were added to 100 kg. of crude isobutyric acid containing about 4% of impurities and the mixture fractionally distilled from a glass-lined still.

The first fraction (about 5% by weight of the still charge) was yellow colored and it consisted for the most part of water, unchanged impurities and a small amount of isobutyric acid. The rest of the still charge was water white and could be used directly without further fractionation.

About two-thirds of the impurities originally present were removed by this single treatment. By repeating the treatment, applying 1 kg. of 30% hydrogen peroxide to the partially purified acid, 90 kg. of chemically pure isobutyric acid were obtained.

*Example VII*

About 3 kg. of potassium permanganate were dissolved in 5 kg. of water and the solution mixed with 100 kg. of a crude isobutyric acid containing about 5.6% of impurities. The mixture was fractionated immediately.

The first fraction (about 10% by weight) was aqueous for the most part but contained some isobutyric acid; it boiled in the range of from 99° C. to 146° C. The second fraction (about 87 kg.) was colorless isobutyric acid containing less than about 1% of impurities.

*Example VIII*

About 6.5 kg. of 70% nitric acid were added to 100 kg. of crude isobutyric acid containing about 6% of impurities and the mixture heated to a temperature of about 150° C. After most of the nitrous oxide fumes had been expelled by boiling of the mixture, about 2.2 kg. of iron powder were added thereto and the mixture fractionated.

The first fraction, collected in the distilling range of from about 97° C. to 140° C. and comprising about 5% of weight of the still charge, was yellowish green in color and contained a large quantity of water. The remainder of the still charge (90 kg.) was colorless, substantially pure isobutyric acid containing less than about 0.8% impurities.

While we have described our invention in some detail and illustrated specific embodiments of the invention, it is to be understood that modifications may be made and that no limitations upon the invention, other than those imposed by the scope of the appended claims, are intended.

We claim as our invention:

1. A process for the removal of detrimental and difficultly-removable oxidizable impurities from a crude isobutyric acid prepared by the oxidation of isobutyraldehyde, which comprises contacting the impure acid in the liquid phase with molecular oxygen in the presence of an oxidation catalyst at a temperature of from about 80° C. to about 120° C. whereby the detrimental impurities present in the acid are substantially oxidized to readily-removable oxidized bodies, and distilling the mixture to separate the oxidized bodies from the acid.

2. A process for the removal of detrimental and difficultly-removable oxidizable impurities from a crude carboxylic acid prepared by the oxidation of the corresponding aldehyde, which comprises contacting the impure acid in the liquid phase at a temperature of from about 80° C. to about 120° C. with molecular oxygen in the presence of an oxidation catalyst whereby the detrimental impurities are oxidized to readily-removable oxidized bodies, and separating the oxidized bodies from the treated acid by distillation.

3. A process for the removal of difficultly-removable oxidizable impurities from a crude carboxylic acid prepared by the oxidation of the corresponding aldehyde, which comprises subjecting the crude acid in the liquid phase to the action of gaseous oxygen and nitric acid in an amount not less than the equivalent of the impurities present at about the boiling temperature of the carboxylic acid, and distilling to separate the oxidized bodies from the refined carboxylic acid.

4. A process for the treatment of an impure normal aliphatic monocarboxylic acid to remove oxidizable impurities therefrom which comprises adding to the liquid crude acid at about its atmospheric boiling temperature, while passing gaseous oxygen through the heated acid, an amount of a concentrated nitric acid solution not less than the equivalent of the impurities present, heating the mixture until the impurities are substantially oxidized, distilling the treated mixture to separate the oxidized bodies from the refined carboxylic acid, subjecting the thus refined carboxylic acid while in the liquid phase and at about its atmospheric boiling temperature to the action of an aqueous hydrogen peroxide solution in an amount at least equivalent to the impurities present in the partially refined acid, and distilling the mixture to obtain the carboxylic acid substantially free of oxidizable impurities.

5. A process for the treatment of an impure butyric acid to remove oxidizable impurities therefrom which comprises adding to the liquid crude acid at about its atmospheric boiling temperature, while passing gaseous oxygen through the heated acid, an amount of a concentrated nitric acid solution not less than the equivalent of the impurities present, heating the mixture until the impurities are substantially oxidized, distilling the treated mixture to separate the oxidized bodies from the refined carboxylic acid, subjecting the thus refined carboxylic acid while in the liquid phase and at about its atmospheric boiling temperature to the action of an aqueous hydrogen peroxide solution in an amount at least equivalent to the impurities present in the partially refined acid, and distilling the mixture to obtain the carboxylic acid substantially free of oxidizable impurities.

6. A process of preparing pure aliphatic monobasic acids which comprises oxidizing an aldehyde with molecular oxygen, separating the acid formed by fractional distillation, and subsequently treating the acid by aeration in the presence of an oxidizing catalyst.

7. The process of preparing pure aliphatic monobasic acids which comprises oxidizing an aldehyde with molecular oxygen, separating the acid formed by fractional distillation, heating the acid to a temperature of about 120° C., diffusing thereinto a stream of air in the presence of an oxidizing catalyst, and subsequently recovering a substantially colorless product.

8. The process of preparing pure butyric acid which comprises oxidizing butyraldehyde with molecular oxygen, separating the butyric acid formed by fractional distillation, and subsequently treating the acid by aeration in the presence of an oxidizing catalyst.

9. The process of preparing pure butyric acid which comprises oxidizing butyraldehyde with molecular oxygen, separating the butyric acid formed by fractional distillation, heating the acid to a temperature of about 120° C., diffusing thereinto a stream of air in the presence of an oxidizing catalyst, and subsequently recovering a substantially colorless product.

10. The process of preparing an aliphatic monobasic carboxylic acid which comprises oxidizing an aliphatic aldehyde with molecular oxygen, separating the acid formed by fractional distillation, and subsequently treating the acid by aeration in the presence of a solid oxidizing catalyst.

11. The process of preparing an aliphatic monobasic carboxylic acid which comprises oxidizing an aliphatic aldehyde with molecular oxygen, separating the acid formed by fractional distillation, heating the acid to a temperature of about 120 C., diffusing thereinto a stream of air in the presence of a solid oxidizing catalyst, and subsequently recovering a substantially colorless product.

12. The process of preparing pure aliphatic monobasic acids which comprises oxidizing an aldehyde with molecular oxygen, separating the acid formed by fractional distillation, and subsequently treating the acid by aeration in the presence of a normally solid oxidizing catalyst.

13. A process for the production of a substantially pure carboxylic acid which comprises oxidizing an aldehyde to the corresponding carboxylic acid by reaction with molecular oxygen under oxidation conditions, distilling the reaction product to separate the crude carboxylic acid therefrom, treating the crude carboxylic acid in the liquid phase with molecular oxygen in the presence of an oxidation catalyst at a temperature of from about 80° C. to about the boiling temperature of the acid, and finally distilling the treated crude acid to obtain a colorless carboxylic acid substantially free of oxidizable impurities.

14. A process for the production of a substantially pure carboxylic acid which comprises oxidizing an aldehyde to the corresponding carboxylic acid by reaction with molecular oxygen under oxidation conditions, distilling the reaction product to separate the crude carboxylic acid therefrom, treating the crude carboxylic acid in the liquid phase and at about the boiling temperature of the carboxylic acid with an amount of an oxidizing agent adequate to substantially completely oxidize the oxidizable impurities without substantial destruction of the carboxylic acid, and finally distilling the treated crude acid to obtain a colorless carboxylic acid substantially free of oxidizable impurities.

15. A process for the production of a substantially pure carboxylic acid which comprises oxidizing an aldehyde to the corresponding carboxylic acid by reaction with molecular oxygen under oxidation conditions, distilling the reaction product to separate the crude carboxylic acid therefrom, treating the crude carboxylic acid in the liquid phase at a temperature of from about 80° C. to about the boiling temperature of the carboxylic acid with molecular oxygen in the presence of nitric acid as a catalyst, and finally distilling the treated crude acid to obtain a colorless carboxylic acid substantially free of oxidizable impurities.

16. A process for the removal of oxidizable impurities from a crude carboxylic acid prepared by oxidation of the corresponding aldehyde, which comprises subjecting the crude carboxylic acid while it is in the liquid phase to treatment with molecular oxygen in the presence of an oxidation catalyst, distilling the treated mixture to separate the at least partially purified carboxylic acid therefrom, subjecting the separated carboxylic acid while in the liquid phase to the action of an oxidizing agent of greater oxidizing power than molecular oxygen, and finally distilling to obtain a colorless carboxylic acid substantially free of oxidizable impurities.

17. A process for the treatment of an impure carboxylic acid to remove oxidizable impurities therefrom which comprises subjecting the carboxylic acid while it is in the liquid phase to treatment with molecular oxygen in the presence of nitric acid as a catalyst at about the atmospheric boiling temperature of the carboxylic acid, distilling the treated mixture to separate the at least partially refined acid, subjecting the separated carboxylic acid while it is in the liquid phase to the action of an effective quantity of an aqueous hydrogen peroxide solution at about the atmospheric boiling temperature of the carboxylic acid, and finally distilling the treated acid to obtain a carboxylic acid substantially free of oxidizable impurities.

18. In a process of preparing a pure aliphatic monobasic carboxylic acid from the corresponding impure acid obtained by the oxidation of an aliphatic aldehyde with molecular oxygen and wherein said impure acid has been removed from the aldehyde oxidation stage, the step of treating said impure acid in the liquid phase with molecular oxygen in the presence of an oxidizing catalyst.

19. In a process of preparing a pure butyric acid from a corresponding impure butyric acid obtained by the oxidation of a butyraldehyde with molecular oxygen and wherein said impure butyric acid has been removed from the butyraldehyde oxidation stage, the step of treating said impure butyric acid in the liquid phase with molecular oxygen in the presence of an oxidizing catalyst.

HERBERT P. A. GROLL.
MIROSLAV W. TAMELE.